United States Patent [19]

Norton

[11] Patent Number: 4,458,795
[45] Date of Patent: Jul. 10, 1984

[54] COUPLING FOR DRIVE SHAFT AND SERVO-MOTOR DRIVEN SHAFT

[76] Inventor: Peter Norton, 15612 Hilton, Southfield, Mich. 48075

[21] Appl. No.: 392,990

[22] Filed: Jun. 28, 1982

[51] Int. Cl.³ ............................ F16D 11/06; B62D 5/04
[52] U.S. Cl. ..................................... 192/43.2; 192/46; 192/71; 180/79.1
[58] Field of Search ............... 192/43.2, 46, 56 R, 192/71; 180/79.1

[56] References Cited

U.S. PATENT DOCUMENTS

| 300,771 | 6/1884 | Fray | 192/43.2 X |
| 1,363,954 | 12/1920 | Carll | 192/43.2 X |
| 1,388,923 | 8/1921 | Bullard | 192/43.2 X |
| 1,388,926 | 8/1921 | Bullard | 192/43.2 X |
| 2,201,705 | 5/1940 | Stone | 192/43.2 |
| 2,395,681 | 2/1946 | Odlum et al. | 192/43.2 |
| 2,869,383 | 1/1959 | Rapp et al. | 180/79.1 X |
| 3,721,324 | 3/1973 | Schweizer | 192/46 X |
| 3,893,534 | 7/1975 | Steinmann | 180/79.1 |
| 4,241,804 | 12/1980 | Deinenger et al. | 180/79.1 |

FOREIGN PATENT DOCUMENTS

| 2237166 | 2/1973 | Fed. Rep. of Germany | 180/79.1 |
| 2247135 | 3/1974 | Fed. Rep. of Germany | 180/79.1 |
| 772682 | 4/1957 | United Kingdom | 180/79.1 |

Primary Examiner—Rodney H. Bonck
Assistant Examiner—David D. House
Attorney, Agent, or Firm—Reising, Ethington, Barnard, Perry & Milton

[57] ABSTRACT

A mechanical coupling for a power steering system and the like having a driven shaft reversibly rotated by a servo-motor in response to either clockwise or counterclockwise rotation of a drive shaft, with the coupling normally connecting the motor to the driven shaft. In the event of any failure of the motor to rotate the driven shaft synchronously with the drive shaft, as for example, due to an electrical power failure, rotation of the drive shaft causes the coupling to disconnect the motor from the driven shaft in the direction opposite to the torque applied by the drive shaft and simultaneously mechanically couple the drive shaft to the driven shaft for direct drive. During that time, the coupling continues to connect the motor to the driven shaft in the direction of shaft rotation. Hence, the direct drive may be assisted by any remaining motor torque, that is, any available torque which is below the level needed to achieve synchronous motion and which is applied in the direction of rotation. But any motor torque or drag applied in a direction opposite to the direction of rotation is disconnected from the driven shaft.

16 Claims, 6 Drawing Figures

COUPLING FOR DRIVE SHAFT AND SERVO-MOTOR DRIVEN SHAFT

BACKGROUND OF DISCLOSURE

This invention relates to a coupling system or assembly for interconnecting a drive shaft, a driven shaft and a servo-motor which normally powers the driven shaft. This mechanism is particularly useful in an automotive vehicle power steering system.

In general, a power steering system for an automotive type vehicle includes a drive shaft or steering column which is controlled by the vehicle operator turning the steering wheel, and a power assist device for the driven steering system. Hydraulic devices are conventionally used to provide the power assist. In addition, it is known to use a servo-motor arrangement to provide the power assist for the drive. An example of the use of a servo-motor arrangement is disclosed in U.S. Pat. No. 3,893,534 issued July 8, 1975 to Steinmann.

In any power assist device used in a power steering system, there is a danger of malfunctioning or power failure. Although failures are rare, it is necessary to provide a direct drive alternative to the power assist drive during times of malfunctioning or failure. When the servo-motor resists or opposes the action of the driver, the servo-motor should be disengaged, whereas it should remain engaged if it provides some assistance even though it may be in a state of partial failure. Prior systems have lacked these qualities to some degree or have had other deficiencies which have kept them from achieving commercial success.

Thus, this invention describes a coupling system which provides a fail-safe connection between the servo-motor power source and the drive and driven shafts or members to allow a direct drive in the event of power failure. During such direct drive the power source is prevented from interfering with, but is allowed to assist the direct drive.

SUMMARY OF INVENTION

The invention herein concerns a coupling system which normally connects a servo-motor to a driven shaft for movement of the driven shaft synchronously with a drive shaft. In the event of partial or full power failure, the system disconnects the drive motor from the driven shaft so that it cannot drive in the direction opposite to the desired direction of rotation of the driven shaft, while maintaining a positive connection between the power and the desired direction of rotation. Thus, during periods of power disablement, to the extent that any power is remaining or available, it may assist, but it may not oppose or interfere with rotation of the driven shaft.

The system is controlled by an actuator on the drive shaft which operates unidirectional clutches such as pawls and ratches for locking and unlocking the power system to the driven shaft. Normally, the actuator is inactive and the pawls and ratchets are in locked position. However, in the event of power failure or malfunctioning, relative movement between the driven shaft and the drive shaft actuator causes the release of those pawls that otherwise would have locked the power drive to the driven shaft in the direction counter to the desired rotational direction. Hence, remaining power in the malfunctioning system cannot interfere with, i.e., oppose, desired rotational direction. Meanwhile, those pawls and ratchets that lock the power system to the driven shaft for rotation in the desired rotation, continue such locking. Thus, any available power can assist.

The system herein contemplates a coupling block mounted on the end of the driven shaft or driven member, with a driven ring such as a ring gear rotatably mounted upon the coupling block. The driven ring is normally driven by the servo-motor. The servo-motor, in turn, is controlled by a suitable sensing mechanism which senses movement of the drive shaft. Therefore, movement of the drive shaft, in either direction, produces corresponding movement of the servo-motor which drives the driven ring.

The driven ring, in turn, is normally locked to the coupling block by means of unidirectional ratcheting detents, such as pawls and ratchets, which positively lock the coupling block and driven ring together for rotation in one direction only. The pawls and ratchets are provided in pairs that work in opposite directions so as to lock the driven ring against relative rotation in both directions. However, release of the appropriate pawls will permit one way relative rotation of the driven ring upon the coupling block.

The drive shaft carries a lever-type actuator located in the coupling block for engaging a control or force transmitting device which operates to retract the pawls for disengaging the ring gear in one direction or the opposite direction relative to the coupling block.

Normally, the drive shaft, the actuator, the coupling block and the driven gear operate in synchronism. However, any rotational movement of the drive shaft which is not followed by corresponding rotation of the coupling block, such as due to a malfunctioning power system or, more accurately, the delivery of insufficient or excessive motor torque, results in angular misalignment between the drive and driven shafts. This causes the actuator to operate the mechanism for disengaging the appropriate pawls and ratchets for discontinuing the locking between the driven ring and coupling block in one direction while continuing the locking in the opposite direction. Simultaneously, the drive shaft activator mechanically locks to the coupling block for direct drive of the coupling block and driven shaft by the drive shaft.

The system described herein is particularly adapted to use in power steering systems in automotive vehicles since the conventional manual steering system is essentially unchanged. Rather, the coupling mechanism of this invention is added to it in an appropriate location without the need for modifying the conventional steering gear box, steering force transmittal linkages, etc. Thus, the coupling herein enables addition of servo-motor assistance to a variety of conventional steering systems without the need for major modifications.

One object of the invention herein is to provide a fail-safe system which will permit direct drive during the time of a power failure or servo-system malfunctioning but which has the ability to utilize available power to the extent that it is applied in the desired steering or rotational direction.

Another object of this invention is to provide a simplified fail-safe coupling between a drive or control shaft, a driven shaft, and the power assist servo-motor system which is relatively inexpensive, can be easily applied to conventional automotive steering systems and which does not require substantial modifications of existing steering systems.

DETAILED DESCRIPTION

Figure 1:
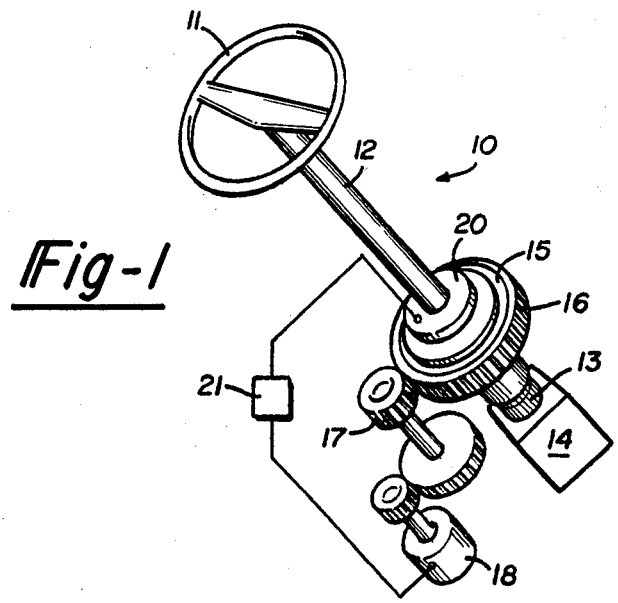
FIG. 1 is a schematic, generally perspective, view of an automotive steering system showing the general application of the coupling.

FIG. 1 schematically illustrates an automobile steering system 10 which, in general, comprises a manually operable steering wheel 11 mounted upon a drive shaft 12. The drive shaft operates a driven shaft 13, which connects to and actuates a conventional steering gear mechanism 14. Such steering gear mechanisms generally comprise appropriate gears, linkages, etc., for turning the vehicle's front wheels in response to the manual turning of the steering wheel.

Mounted upon the driven shaft 13 is a coupling block 15. A ring gear 16 is rotatably mounted upon the peripheral surface of the coupling block.

This ring gear is driven by a gear train 17 connected to a reversible servo-motor 18.

When the steering wheel 11 rotates the drive shaft 12, a sensing device 20, which is schematically shown, senses the angular movement of the drive shaft. The sensing device signals and controls, through an appropriate amplifier-control system 21, the synchronous operation of the servo-motor. The particular type of sensor selected is within the skill of the art and forms no part of the invention. Likewise, the drive train and servo-motor is also conventional. Thus, these components are illustrated only schematically.

Figure 3:
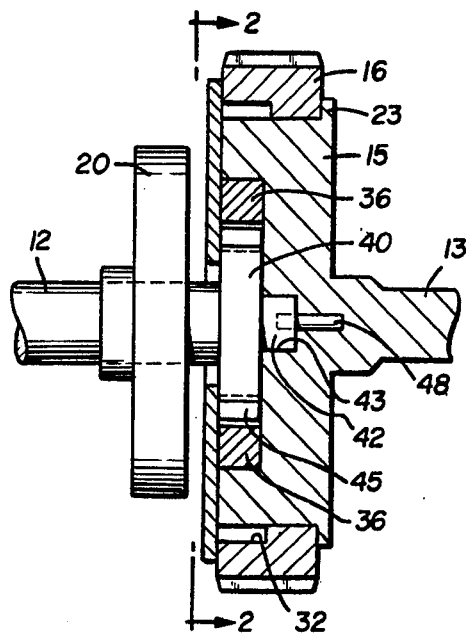
FIG. 3 is a cross-sectional view taken in the direction of arrows 3—3 of FIG. 2.

As shown in FIG. 3, the ring gear 16 is maintained in position upon the coupling block by suitable lips or flanges, such as flange 23 formed on one edge of the coupling block. Other suitable guides (not shown) may be provided to properly position the gear.

Figure 6:
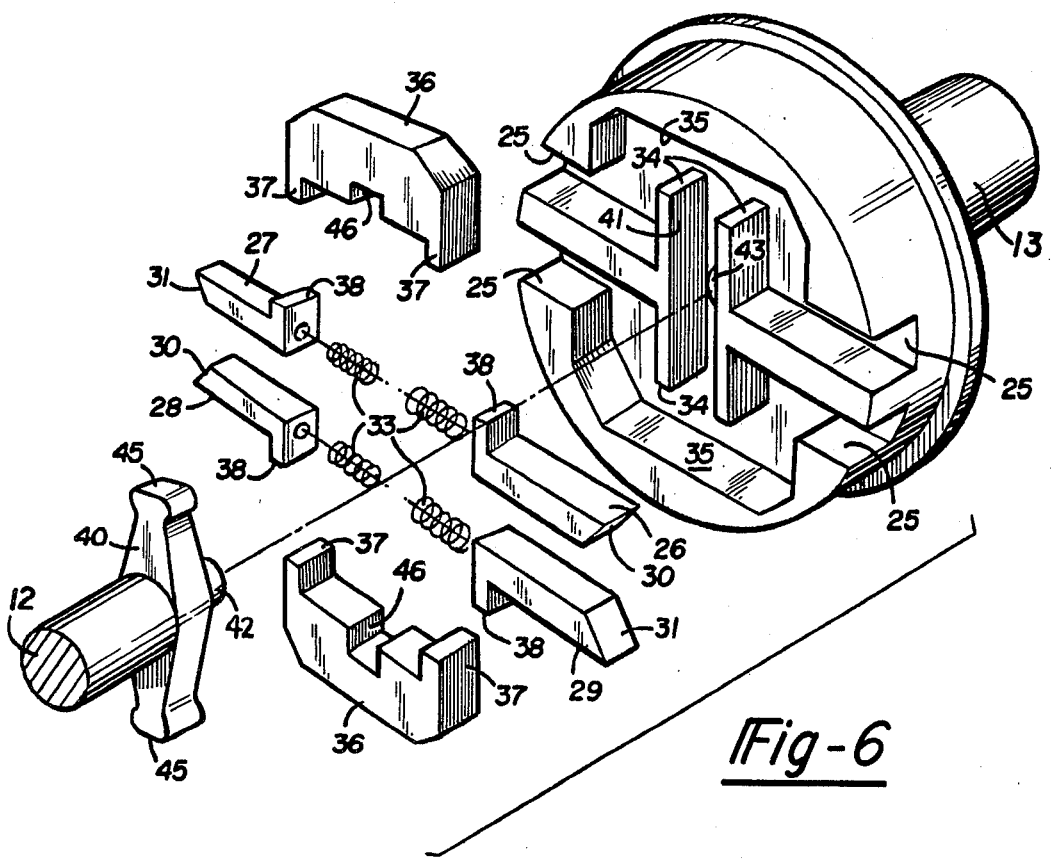
FIG. 6 is a disassembled view of the coupling block, detents, detent operators and the actuator end of the drive shaft, showing the relationship between these parts.

Referring to FIG. 6, the coupling block includes two opposing pairs of elongated passages 25 which are transverse to the block axis. Bar-like pawls are slidably fitted within the passages. There are two pairs of opposed pawls 26 and 27; and 28 and 29. The outer ends of the pawls are each formed with a chisel or sloped surface, with the pawls 26 and 28 having similar sloped ends 30 that are sloped in one direction and pawls 27 and 29 having ends 31 that are oppositely sloped.

The chisel or sloped ends of the pawls slidably fit into notches 32 which are formed on the inside surface of the ring gear 16. As can be seen in the drawings, the notches are equally spaced along the surface of the gear so that the pawls engage whichever notches are adjacent to them at any particular time. Because of the sloped ends of the pawls, they operate as unidirectional connectors. That is, the pawls 26 and 28 positively lock the coupling block and gear together for rotation in one direction but release, in a ratchet-like action, in the event of opposite relative rotation of the gear upon the coupling block. Conversely, the pawls 27 and 29 unidirectionally positively lock the gear to the coupling block for rotation in a direction opposite to that mentioned above. Equally, these pawls release in a ratchet-like manner, where the rotational direction is reversed. Consequently, it can be seen that by retracting pawls 26 and 28, or alternatively, pawls 27 and 29, the gear 16 will be locked upon the coupling block for rotation in one direction, but will slip or rotate should the direction be reversed.

Springs 33 urge the pawls outwardly into engagement with their adjacent notches. Conventional coil springs may be used or alternatively, conventional spring loaded plungers, can be used. Thus, the pawls are normally extended outwardly into locking positions.

The springs 33 engage internal stop flanges 34 located within the central portion of the coupling block cavity. On opposite sides of these flanges are recesses or cavities 35 which are relatively elongated and which receive sliders 36. These sliders function as linear force transmitting members.

Each of the sliders has end flanges 37 which engage adjacent flanges 38 formed on the pawls. Thus, linear movement of the sliders beyond a certain point produce sliding or retracting movements of the pawls.

The drive shaft 12 has an inner end located within the coupling block. A lever-like actuator 40 is formed on or attached to this inner end and extends transversely to the axis of the shaft. This actuator fits into a central recessed portion 41 located between the coupling block internal stop flanges 34.

The drive shaft end 42 rotatably fits within a socket 43 formed within the coupling block. Thus the lever-like actuator is positioned transversely of the axes of the drive and driven shafts and between the inner ends of the pawls.

The opposite ends of the actuator are formed with rounded end portions 45 which fit into notches 46 formed in the respective sliders. Consequently, rotation of the drive shaft relative to the coupling block correspondingly rotates the actuator whose rounded end portions 45 swing around the drive shaft axes to cause the sliders to move linearly.

OPERATION

Figure 2:
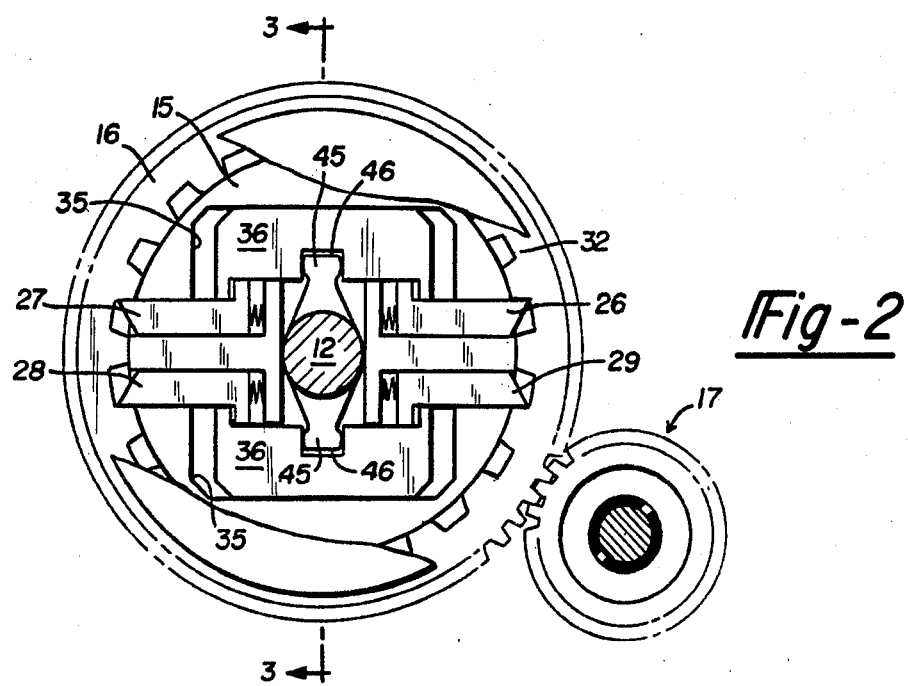
FIG. 2 is an end view of the driven shaft hub or coupling block, taken in the direction of arrows 2—2 of FIG. 3.
Figure 5:
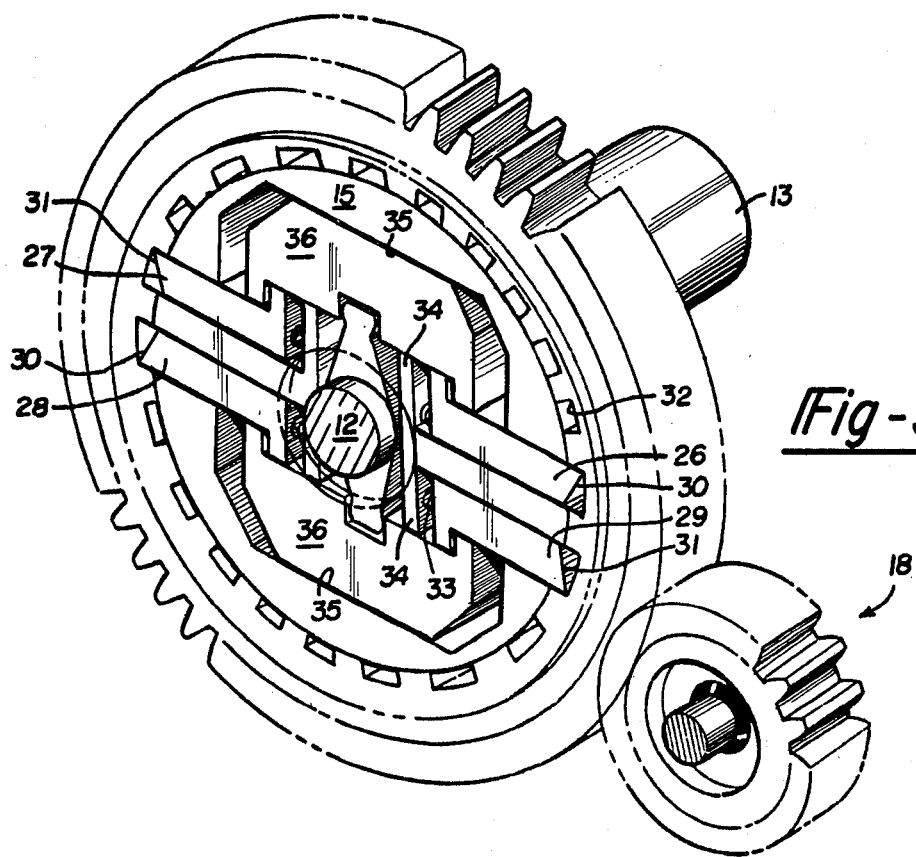
FIG. 5 is a perspective view of the clutch assembly.

In normal operation, the coupling parts are located as illustrated in FIGS. 2 and 5. The lever-like actuator 40 is centered between the coupling block internal stop flanges 34. This centers the sliders 36. At the same time, the springs 33 force the pawls 26-27-28-29 outwardly into seating engagement with adjacent slots 32 in the ring gear. Consequently, the pawls positively lock the ring gear to the coupling block for rotation together in either a clockwise or counter-clockwise direction.

During this normal operation, the driver turns the steering wheel 11 either clockwise or counter-clockwise. The sensor 20 senses the turning movement and transmits a signal to the amplifier and control system 21 which in turn controls the servo-motor 18. Thus, the motor operates in response to the turning of the steering wheel and drive shaft and transmits power through the gear train 17 to the ring gear 16. The ring gear 16, due to the power assist from the motor, rotates synchronously with the drive shaft to rotate the coupling block. When the driven shaft 13 is rotated, it operates the conventional steering gear box 14 for steering the vehicle in the conventional manner.

In the event of a power failure or malfunction of the power assist motor or its controls or power train, etc., the coupling system operates to directly couple the driving shaft to the driven shaft and to disengage any power assist applied in a direction counter to desired rotational direction.

Figure 4:
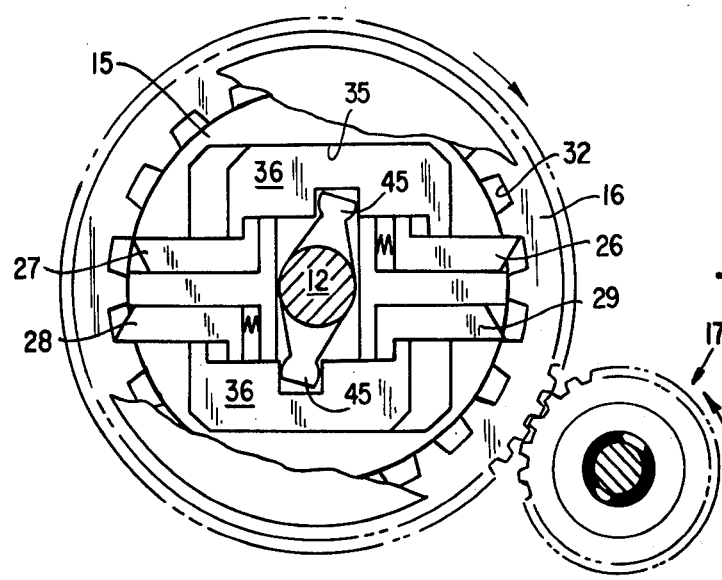
FIG. 4 is a view similar to FIG. 2, but illustrating the actuator retracting certain of the detents with the drive shaft being in direct drive position.

Referring to FIG. 4, assuming a partial power failure, rotation of the steering wheel 11 in a clockwise direction causes the drive shaft 12 to rotate into the position shown in FIG. 4. That is, the drive shaft and the actuator have rotated angularly a predetermined amount relative to the rotation of the coupling block. This takes place whenever the power produced by the power assist servo-motor is insufficient or greater than required to keep the coupling block and the drive shaft in synchronism.

The opposite ends of the actuator move the sliders 36 to retract the pawls 27 and 29. Hence, the pawls 26 and 28 couple the gear 16 to the coupling block for power assistance in a clockwise direction. However, counter-clockwise rotation of the gear 16 upon the coupling block is permitted, first, because the unidirectional pawls 27 and 29 are withdrawn or retracted and second, because the still operating pawls 26 and 28 will ratchet out of the way relative to the slots 32 on the gear 16 when the gear rotates counter-clockwise.

Because each of the sliders 36 abut ends of the respective coupling block recesses 35, as illustrated in FIG. 4, there is a solid, direct drive connection between the shaft 12, through the actuator, to the coupling block for positive drive of the coupling block by the shaft 12. Thus, there is a lost motion connection between the actuator 40 and the coupling block 15. To the extent that the power assist system is still able to produce torque, even though at a level below normal, that torque, if applied in the direction of desired rotation (see arrows in FIG. 4), will assist the turning of the coupling block and driven shaft. Conversely, if there is torque applied in the opposing direction, such as due to malfunctioning of the servo-motor, then that torque causes idling rotation of the gear 16 upon the coupling block and the power is not transmitted to the coupling block. Thus, wrongly directed torque does not oppose or interfere with the direct rotational effort of the direct drive of drive shaft 12 to the coupling block.

Rotation of the drive shaft 12 in the opposite, counter-clockwise direction, produces a reverse effect to that shown in FIG. 4. Thus, there is a fail-safe coupling which operates independently of any power failure or malfunctioning of the power assist system but which can take advantage of any remaining power so long as it is applied in the direction of rotation.

Since during normal operation, the drive shaft is functionally separated from the driven shaft, the vehicle driver would not get a steering "feel" of the road. To provide him with such "feel" a torsionally elastic shaft 48 is fastened to and extends between the end 42 of the drive shaft and the socketed end of the coupling block-driven shaft, as illustrated in FIG. 3. Other "feel" providing devices may also be used.

As can be seen, this coupling system can be used in other applications in which a similar coupling arrangement is desired. Thus, although described in connection with use in an automotive vehicle power steering system, the coupling herein may have applications in various systems wherein there is a drive means which controls a power assist system for driving a driven means and wherein a fail-safe direct connection is required in the event of failure of the power assist.

Having fully described an operative embodiment of this invention, I now claim:

1. A drive transmitting coupling for use with a control member, a driven member and a driving means comprising:

lost motion means adapted to couple said control member with said driven member for transmitting driving effort from said control member to said driven member, a first one-way clutch adapted to couple said driving means with said driven member for transmitting driving effort in one direction, a second one-way clutch adapted to couple said driving means with said driven member for the transmitting driving effort in the opposite direction, means for disengaging said second one-way clutch in response to movement of said control member in said one direction relative to said driven member, means for disengaging said first one-way clutch in response to movement of said control member in said opposite direction relative to said driven member, whereby driving effort is not transmissible from said driving means to said driven member in the direction opposite the driving effort transmitted from said control member through said lost motion means to said driven member.

2. The invention as defined in claim 1 wherein said control member, driven member and driving means are adapted to transmit rotational effort and wherein, said lost motion means transmits torque between said control member and said driven member, and said first and second one-way clutches transmit torque between said driving means and said driven member.

3. A manually controlled, power assisted drive system for driving a load device comprising, a control member adapted to be manually actuated, a driven member adapted to be coupled with the load device, first coupling means for coupling the control member to the driven member whereby the load device can be driven by manual actuation of the control member, driving means, second coupling means for coupling the driving means to the driven member for simultaneously enabling transmission of torque in both directions whereby the load device can be driven by the driving means, and decoupling means operatively engageable with said second coupling means for unidirectionally decoupling the driving means from the driven member so the action of the driving means cannot oppose driving effort transmitted by said first coupling means from the control member to the driven member.

4. The invention as defined in claim 3 wherein, said second coupling means comprises first and second one-way clutches for selectively driving said load device in first and second directions, said decoupling means being operative to disengage one of said clutches in accordance with the driving effort transmitted by said first coupling means from the control member to the driven member.

5. The invention as defined in claim 4 wherein, said first and second one-way clutches each comprises a pawl and ratchet.

6. The invention as defined in claim 5 wherein, said first coupling means comprises a coupling member connected with said driven member, and said control member is engageable with said coupling member for movement thereof in either of the first or second directions.

7. The invention as defined in claim 6 wherein, said coupling member has a lost motion connection with said driven member.

8. The invention as defined in claim 3 wherein said first coupling means comprises a lost motion means.

9. The invention as defined in claim 8 wherein, said second coupling means comprises first and second one-way clutches for selectively driving said load device in first and second directions, said decoupling means being operative to disengage one of said clutches in accordance with the relative movement of the control member with respect to the driven member.

10. The invention as defined in claim 8 wherein, said decoupling means is actuated by said lost motion means.

11. The invention as defined in claim 9 or 10 wherein, said first and second one-way clutches each comprises a pawl and ratchet.

12. The invention as defined in claim 3 including a motor coupled with said driving means for imparting driving effort thereto.

13. The invention as defined in claim 12 wherein, said first coupling means comprises a coupling member connected with said driven member and said control member, said control member being coupled through said coupling member with said driven member for movement thereof in either first or second directions, said second coupling means comprises a drive-transmitting member mounted on said driven member and being driven by said motor and first and second one-way clutches having opposite drive directions for connecting said driven member with said drive-transmitting member, said decoupling means comprising actuating means on said coupling member and coacting with said one-way clutches for disengaging the one of said clutches which has a drive direction opposite the direction of relative displacement between the control member and the driven member.

14. The invention as defined in claim 13 wherein, said first one-way clutch comprises ratchet teeth on said drive-transmitting member, a first pawl movably mounted on said driven member and engageable with the ratchet teeth, said second one-way clutch comprises ratchet teeth on said drive-transmitting member, a second pawl movably mounted on said driven member and engageable with the ratchet teeth, said coupling member comprises a slide mounted on said driven member for movement between abutments, said slide being movable by said control member as a consequence of relative motion between said control member and said driven member, said actuating means being on said slide and coating with said pawls whereby either the first or second pawl is engaged with the ratchet teeth and the other may be disengaged depending upon the direction and amount of said relative displacement, and whereby relative movement of the control member in either direction may cause said slide to engage one of the said abutments on the driven member and to move the driven member.

15. The invention as defined in claim 3, 9, or 14 wherein, said load device includes the steering gear of an automotive vehicle and said control member is adapted to be actuated by a steering wheel.

16. The invention as defined in claim 3, 9, or 14 including:
a sensing device for sensing movement of the control member relative to the driven member, and an amplifier for coupling said sensing device with said motor for controlling the energization of said motor.

* * * * *